UNITED STATES PATENT OFFICE.

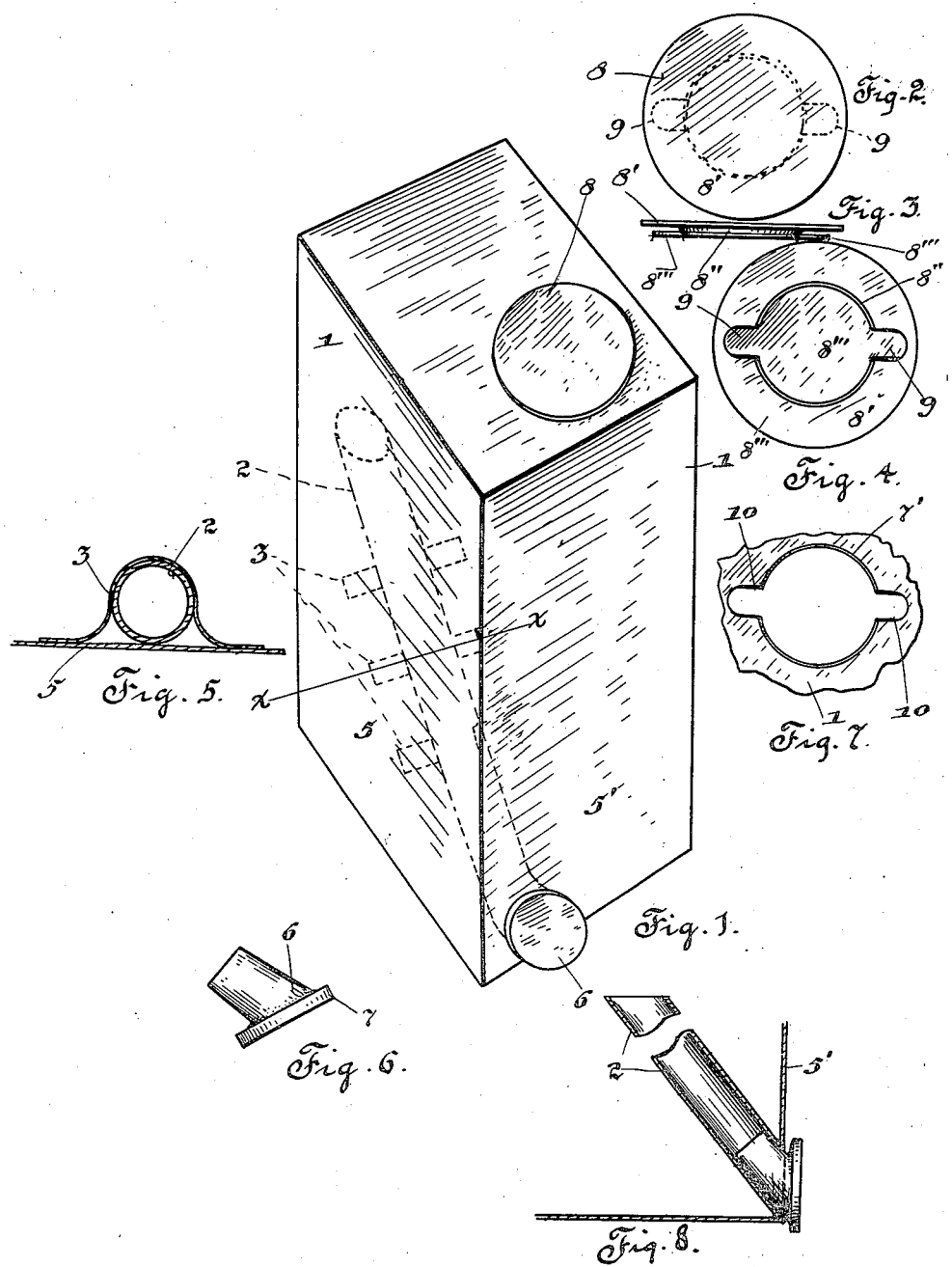

HERMAN R. SCHIFF, OF CHICAGO, ILLINOIS.

MILK-BOTTLE.

968,425.  Specification of Letters Patent.  Patented Aug. 23, 1910.

Application filed November 15, 1909. Serial No. 528,149.

*To all whom it may concern:*

Be it known that I, HERMAN R. SCHIFF, a citizen of the United States, residing at Chicago, county of Cook, and State of Illinois, have invented certain new and useful Improvements in Milk-Bottles, of which the following is a specification.

My invention relates to improvements in milk bottles and has for its object the provision of a milk bottle or receptacle having improved means incorporated therein whereby the cream may be drawn from the milk.

A further object of my invention is to provide a milk receptacle of inexpensive material such as paper so that the same may be thrown away after a single use thereof, thus avoiding the trouble and expense of cleaning bottles and giving the customer the assurance that the bottles are always in a sanitary condition.

Other objects will appear hereinafter.

With these objects in view my invention consists in the novel construction and arrangement of parts which will be hereinafter fully described and particularly pointed out in the appended claims.

My invention will be best understood by reference to the accompanying drawings forming a part of this specification, and in which, Figure 1 is a perspective view of my improved milk bottle in its preferred form, Fig. 2 is a top plan view of an improved stopper provided for the bottle, Figs. 3 and 4 are respectively side and bottom views thereof, Fig. 5 is a section of a wall and tube of the bottle taken substantially on line *x—x* of Fig. 1, Fig. 6 is a side view of an improved cork provided for the bottle, Fig. 7 is a fragmentary top plan view showing the opening adapted to receive the bottle stopper, and Fig. 8 is a vertical section showing an inclined tube and the cork inserted therein.

Referring now to the drawings, 1 designates a preferably rectangular receptacle composed of paper or other inexpensive material, and 2 an inclined paper tube secured therein on one of the walls thereof as indicated by dotted lines in Fig. 1. This tube is preferably secured by means of paper strips 3 which are pasted thereto and to a wall 5 of the receptacle as clearly shown in Fig. 5. The lower end of the tube 2 is cut off obliquely and pasted to the wall 5 around an opening provided therein. The upper end of the tube 2 is also cut off obliquely so that the same will be level when placed in position. A paper cork 6 having a head 7 inclined to the axis thereof is adapted to close the opening of the tube 2 so that said head will be substantially parallel with the wall 5', this feature being of advantage since a minimum of space is required for the bottle during shipment. The top of the tube 2 is designed to register with the level of the bottom of the cream so that when the cork is withdrawn the cream will flow out and leave the milk in the bottle, the latter to be preferably turned out through the opening 7'.

The stopper 8 is composed of three layers of paper pasted together, the top layer 8' being circular as shown in Fig. 2. The intermediate layer of paper 8'' has the form of a truncated cone and the bottom layer 8''' is provided with two diametrically disposed ears 9 which are adapted to fit into corresponding recesses 10 of the opening 7', the latter being of a proper size to receive the conical portion of the stopper. After the stopper 8 is inserted in the opening 7' the same is rotated slightly which causes the ears 3 to be carried under the top of the bottle and thus to securely lock the stopper in position. The conical portion of the stopper is adapted to fit snugly in the opening 7' so that when the stopper is locked in position a perfect seal is the result.

While I have shown what I deem to be the preferable form of my invention I do not wish to be limited thereto as there might be various changes made in the details of construction and the arrangement of parts described without departing from my invention, and hence I desire to avail myself of such changes and alterations as fairly fall within the spirit and scope of the appended claims.

Having described my invention what I claim as new and desire to secure by Letters Patent is:

1. In a device of the class described, a receptacle having an opening in the top thereof, a stopper for closing said opening, an inclined tube secured in said receptacle the lower end thereof terminating in an opening provided in the wall of a receptacle and the upper end thereof terminating below the top of the receptacle, and a cork provided with an angularly disposed head and to close the lower opening of said tube, said first named opening being provided in order that milk may be poured into the receptacle and the second named opening for the withdrawal of cream therefrom, substantially as described.

2. In a device of the class described, a receptacle having an opening in the top thereof, a stopper for closing said opening, an inclined tube secured in said receptacle by means of paper strips pasted thereto and to a wall of said receptacle, the lower end of said tube terminating in an opening provided in a wall of the receptacle and the upper end thereof terminating below the top of the receptacle, and a cork provided to close the lower opening of said tube, substantially as described.

In testimony whereof I have signed my name to this specification in the presence of two subscribing witnesses.

HERMAN R. SCHIFF.

Witnesses:
HELEN F. LILLIS,
JOSHUA R. H. POTTS.